UNITED STATES PATENT OFFICE 2,536,849

METHOD OF PREPARING AN ISOCYANURATE

Donald W. Kaiser, Old Greenwich, and Dagfrid Holm-Hansen Church, Stamford, Conn., assignors to American Cyanamid Company, New York, N. Y., a corporation of Maine No Drawing. Application July 26, 1949, Serial No. 106,976

12 Claims. (Cl. 260—248)

This invention relates to a new and improved method of preparing isocyanurates. More particularly it is concerned with the method of preparing an isocyanurate which comprises effecting reaction under heat between (1) an alkali-metal cyanate, more particularly a cyanate of sodium, potassium, lithium, rubidium or caesium, and (2) a hydrocarbon halide (active hydrocarbon halide) represented by the formula RX, where X represents halogen (e. g., chlorine, bromine, iodine) and R represents a radical selected from the class consisting of alkyl (including cycloalkyl), alkenyl (including cycloalkenyl), aralkyl and aralkenyl radicals. Thus, the hydrocarbon halide can be one which is embraced by the formula RX, but which can be represented, for example, by the more specific formula RCl, where R has the same meaning as given above with reference to RX. In all cases the reaction is effected while the reactants of (1) and (2) are incorporated in a suitable reaction medium, more particularly while they are admixed with an inert, non-hydroxylated solubilizing agent for improving the solubility of the alkali-metal cyanate in the reaction mass, specifically acetronitrile. The isocyanurate which is thereby produced is then isolated from the resulting reaction mass.

The isocyanurates resulting from the method of our invention may be represented by the general formula I 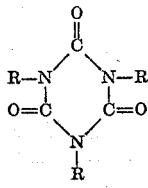

where R has the same meaning as given above with reference to the formula RX for the hydrocarbon halide of (2).

It was known prior to our invention that isocyanurates of the kind embraced by Formula I could be prepared by rearrangement of a normal cyanurate by heating; and also by reaction of a silver salt of cyanuric acid with an alkylating agent such, for example, as methyl iodide.

The present invention is based on our discovery that isocyanurates of the kind embraced by Formula I can be produced in yields as high as 80% from relatively inexpensive, non-toxic materials by a direct, one-step process as briefly described in the first paragraph of this specification and more fully hereafter. More particularly we have found that such isocyanurates can be prepared by heating under atmospheric pressure or, preferably, under superatmospheric pressure, e. g., at pressures ranging from 20 pounds to 10,000 pounds or more per square inch, and at a temperature within the range of about 65° C. (preferably at least about 100° C.) to about 175° C., or a little higher, e. g., about 200° C., a mixture consisting essentially of an alkali-metal cyanate and a hydrocarbon halide represented by the formula RX, where R and X have the same meanings as given hereinbefore, and, as the third essential component, acetonitrile or other inert, non-hydroxylated solubilizing agent for increasing the solubility of the alkali-metal cyanate in the reaction mass. Such an additive also can be described more generally as a reaction medium, that is, a medium in which reaction is effected between the alkali-metal cyanate and the hydrocarbon halide. Reaction at atmospheric pressure, e. g., by heating at such pressure under reflux at the boiling temperature of the reaction mass, is generally less satisfactory from a practical standpoint. The reaction mass is preferably agitated, e. g., by mechanical stirring, during the reaction period, which may range, for instance, from ½ hour to 24 hours or longer, depending, for example, upon the size of the batch, the temperature of reaction, the particular reactants and molar proportions thereof which are employed, kind of apparatus used, and other influencing factors.

Taking potassium cyanate as illustrative of the alkali-metal cyanate employed, the above reaction may be illustrated by the following equation:

II 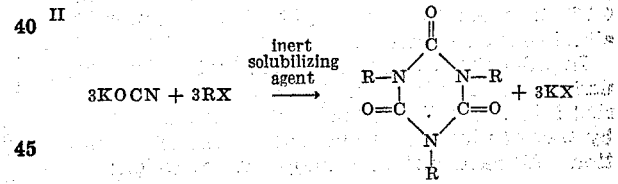

It was quite surprising and unexpected to find that an alkali-metal cyanate and an active hydrocarbon halide of the kind described under (2) of the first paragraph herein could be caused to react together to yield an isocyanurate, since ordinarily it would be expected that, if any reaction occurred, it might take the course illustrated by the following equation:

III 

or, the course illustrated by the following equation:

$$\text{IV} \quad KOCN + RX \rightarrow RNCO + KX$$

The chosen hydrocarbon halide is dependent upon the particular isocyanurate which it is desired to produce. Illustrative examples of hydrocarbon halides that can be used are benzyl, phenylethyl and other aralkyl chlorides, bromides and iodides; methyl, ethyl, propyl, isopropyl, butyl, amyl, isoamyl, hexyl, heptyl, octyl, nonyl, decyl and other alkyl chlorides, bromides and iodides; allyl, methallyl, crotyl, ethallyl, pentenyl, hexenyl, heptenyl, octenyl, and other alkenyl chlorides, bromides and iodides; and alpha-phenyl-allyl and other aralkenyl chlorides, bromides and iodides.

The preferred inert, non-hydroxylated solubilizing agent is acetonitrile, since optimum results have been obtained by its use. Examples of other solubilizing agents or media in the presence of which the reaction can be effected, although with less satisfactory results than with acetonitrile, are propionitrile, $\beta$-methoxypropionitrile, dimethylcyanamide, acetone, dioxane and nitrobenzene. The water-soluble, non-hydroxylated solubilizing agents are preferred over those which are water-insoluble or have a low order of solubility in water.

The molar ratios of alkali-metal cyanate and hydrocarbon halide can be varied fairly widely, since the excess over stoichiometrical proportions is merely present in the reaction mass as unreacted or partly reacted material. For example, both of the reactants can be used in equal molar proportions, or with the alkali-metal cyanate or the hydrocarbon halide in excess of the other, e. g., from 0.5 to 25 or 30 mole per cent, or even as much as 50 mole per cent, of the one in excess of the other. The acetonitrile or other solubilizing agent for the alkali-metal cyanate can be varied as desired or as conditions may require, e. g., a volume amount ranging from about $\frac{1}{10}$ to about 20 times the total volume of the alkali-metal cyanate and hydrocarbon halide at the reaction temperature.

If desired, the reaction can be accelerated by incorporating a suitable catalyst into the reaction mass, for instance a tertiary-amine, e. g., triethyl, tripropyl, triisopropyl, tributyl, triamyl or other trialkyl amine, pyridine, etc.; or, when a hydrocarbon chloride, e. g., an alkyl chloride, is employed as a reactant, the catalyst can be an alkali-metal iodide such as sodium iodide, potassium iodide, etc. If a catalyst is used the amount thereof can be varied as desired or as conditions may require, but ordinarily the catalyst is employed in an amount corresponding to from about 0.1% to about 10% by weight of the amount of alkali-metal cyanate used.

In order that those skilled in the art better may understand how the present invention can be carried into effect, the following examples are given by way of illustration and not by way of limitation. All parts and percentages are by weight.

*Example 1*

| | Parts | Approx. Molar Ratios |
|---|---|---|
| Potassium cyanate (94.2%) | 86.0 | 1.0 |
| Allyl chloride | 80.5 | 1.05 |
| Acetonitrile | 391.4 | |

A mixture of the above ingredients was heated and agitated in a rocking-type autoclave for 3 hours at 150° C. under superatmospheric pressure. After filtering off the resulting salt (KCl) and distilling the low-boiling fraction at atmospheric pressure, the residue distilled between 107° C. and 114° C. under a pressure of 0.5 mm. There was obtained 69 parts of triallyl isocyanurate containing some solid material which slowly crystallized on standing. Upon filtration of the crude product, 2.5 parts of crystals of sym.-diallylurea was obtained. The yield of triallyl isocyanurate was 80%. A sample of the crude triallyl isocyanurate from which the diallylurea had been filtered off gave the following results when analyzed for nitrogen:

| | %N |
|---|---|
| Calculated for $C_{12}H_{15}N_3O_3$ | 16.86 |
| Found | 16.78 |

Crystallization of the sym.-diallylurea from cyclohexane gave crystalline plates melting at 95° C. A mixed melting point of these crystals with a known sample of sym.-diallylurea showed no depression.

The formation of sym.-diallylurea as one of the reaction products in the above example, and in other examples which follow, is the result of the presence of a slight quantity of water in the initial reactants when they are charged to the clave.

*Example 2*

Same as in Example 1 with the exception that 76.5 parts of allyl chloride was used. In other words the potassium cyanate and allyl chloride were employed in equal molar proportions. There was obtained 63 parts of crude triallyl isocyanurate boiling within the range of 103°–113° C. at 0.3 mm. pressure. The crude triallyl isocyanurate contained a small amount of sym.-diallylurea.

*Example 3*

Same as in Example 2 with the exception that there was used 313.1 parts of acetonitrile. The yield of crude triallyl isocyanurate was 59.5 parts, which boiled at 105°–112° C. under a pressure of 0.5 mm. and from which 5 parts of sym.-diallylurea was removed by filtration.

*Example 4*

| | Parts | Approx. Molar Ratios |
|---|---|---|
| Potassium cyanate (94.2%) | 215.0 | 2.5 |
| Allyl chloride | 198.9 | 2.6 |
| Acetonitrile | 978.5 | |

The above ingredients were heated together with stirring for 3 hours at 150° C. under superatmospheric pressure. The yield of triallyl isocyanurate was 51.5 parts, while the yield of sym.-diallylurea was 23.5 parts. There remained in the reaction vessel 70 parts of black, resinous material.

*Example 5*

| | Parts | Approx. Molar Ratios |
|---|---|---|
| Potassium cyanate (94.2%) | 86.0 | 1.0 |
| Allyl chloride | 80.5 | 1.05 |
| Nitrobenzene | 993.4 | |

A mixture of the above ingredients was heated and agitated in a rocking-type autoclave for 3 hours at 150° C. under superatmospheric pressure, yielding 6 parts of triallyl isocyanurate and 15 parts of residue.

*Example 6*

|  | Parts | Approx. Molar Ratios |
|---|---|---|
| Potassium cyanate (94.2%) | 24.1 | 1.0 |
| Allyl chloride | 22.4 | 1.04 |
| β-Methoxypropionitrile | 131.0 | | were heated together with agitation in a rocking-type autoclave for 3 hours at 150° C. under superatmospheric pressure, yielding 2.5 parts of triallyl isocyanurate which boiled at 105°–112° C. under a pressure of 0.1 mm. The residue amounted to 10 parts.

*Example 7*

|  | Parts | Approx. Molar Ratios |
|---|---|---|
| Potassium cyanate (92.6%) | 87.5 | 1.0 |
| Allyl chloride | 80.5 | 1.05 |
| Propionitrile | 391.5 | | were heated together with agitation in a rocking-type autoclave under a pressure of about 100 pounds per square inch for 3 hours at 150° C., yielding a black reaction mass. This reaction mass was filtered and the solubilizing agent or reaction medium (propionitrile) was then distilled from the filtrate. Benzene was added to the residue and the mixture was filtered. The filtered benzene solution was washed with water and then dried over calcium sulfate. Distillation of the washed and dried benzene solution yielded, after removal of the benzene, 28 parts of triallyl isocyanurate, which corresponds to about 34% of the theoretical yield.

*Example 8*

|  | Parts | Approx. Molar Ratios |
|---|---|---|
| Potassium cyanate (92.6%) | 87.5 | 1.0 |
| Allyl chloride | 80.5 | 1.05 |
| Dimethylcyanamide | 443.1 | |

A mixture of the above ingredients was heated with agitation in a rocking-type autoclave under superatmospheric pressure for 3 hours at 150° C. The resulting reaction mass was filtered to remove the inorganic solid (KCl plus unreacted KOCN). The dimethyl cyanamide was distilled from the filtrate under a pressure of 30 mm., while the residue was distilled at 0.05 mm. pressure. A solid co-distilled with the triallyl isocyanurate. Separation of the two products gave 14 parts of triallyl isocyanurate (17% of the theoretical) and 10 parts of N,N-dimethylurea, which latter is formed as a result of hydrolysis of the dimethylcyanamide. The formation of N,N-dimethylurea can be avoided by thoroughly drying all of the starting materials and by carefully excluding water or moisture from the reaction mass and from the crude product during all processing operations.

*Example 9*

This example illustrates the preparation of tri-n-butyl isocyanurate and the use of potassium iodide as a catalyst for the reaction.

|  | Parts | Approx. Molar Ratios |
|---|---|---|
| Potassium cyanate (92.6%) | 87.5 | 1.0 |
| n-Butyl chloride | 97.5 | 1.05 |
| Potassium iodide | 5.0 | |
| Acetonitrile | 391.4 | | were mixed and heated together with agitation in a rocking-type autoclave under superatmospheric pressure for 3 hours at 175° C., after which the reaction mass was filtered. After removing the low-boiling material by distillation at atmospheric pressure, the following cuts were obtained by distilling the remainder of the material under reduced pressure:

| Cut | Pressure | Temperature | Parts |
|---|---|---|---|
|  | *Mm.* | °*C.* |  |
| A | 0.05 | 82–120 | 4.5 |
| B | 0.05–0.1 | 128–140 | ¹ 55 |

¹ Partly solid.

Cut B was dissolved in hexane and then cooled in an ice bath. The compound N,N'-di-n-butylurea, which separated from the cooled solution, was filtered off and dried. The yield of N,N'-di-n-butylurea was 16 parts. The filtrate was distilled, yielding 30 parts of crude tri-n-butylisocyanurate, boiling at 132°–150° C. under 0.05 mm. pressure. Further purification by redistillation, using a higher fractionating column, gave 25.5 parts (27% of the theoretical) of tri-n-butyl isocyanurate, B. P. 151°–155° C. at 0.9 mm., and showing the following upon analysis for nitrogen:

Per cent N
Calculated for tri-n-butyl isocyanurate____ 14.14
Found _____ 14.46

After the first distillation a small amount (approximately 3 parts) of liquid lachrymatory material was collected in a Dry Ice (solid carbon dioxide) trap. This liquid material reacted with aniline to give a solid, M. P. 121° C., which was found by analysis to be N-n-butyl-N'-phenylurea.

Per cent N
Calculated for N-n-butyl-N'-phenylurea __ 14.59
Found _____ 14.48

The liquid material collected in the Dry Ice trap was, therefore, n-butyl isocyanate.

*Example 10*

This example illustrates the preparation of triallyl isocyanurate using triethyl amine as a catalyst for the reaction.

|  | Parts | Approx. Molar Ratios |
|---|---|---|
| Potassium cyanate (92.6%) | 44.0 | 1.0 |
| Allyl chloride | 38.5 | 1.0 |
| Triethyl amine | 1.0 | |
| Acetonitrile | 156.5 | |

A mixture of the above ingredients was heated under reflux with stirring for 20 hours in a reaction vessel placed on a steam bath, the reflux temperature being 71° C. The reaction mass was filtered and the filtrate was distilled. There was obtained 9 parts of a fraction which distilled at 112°–129° C. at 0.05 mm. pressure and which, on cooling, partially solidified. This product was identified as a mixture of triallyl isocyanurate and sym.-diallylurea.

The described reaction was carried out initially in an attempt to obtain allyl isocyanate. From our other investigations in this field it was believed that if the reaction could be carried out at a temperature much lower than 150° C., using a suitable catalyst to accelerate the reaction between the alkali-metal cyanate, specifically potassium cyanate, and the hydrocarbon halide, more particularly allyl chloride, then it might be possible to obtain the corresponding hydrocarbon isocyanate, specifically allyl isocyanate, instead of the hydrocarbon isocyanurate. Contrary to these expectations it was found that, although a tertiary amine (more particularly triethyl amine) catalyzed the reaction, no allyl isocyanate was produced but instead there was obtained triallyl isocyanurate together with sym.-diallylurea.

*Example 11*

|  | Parts | Approx. Molar Ratios |
|---|---|---|
| Potassium cyanate (92.6%) | 263 | 1.0 |
| Allyl chloride | 240 | 1.05 |
| Acetonitrile | 1,174 | | were heated together in an autoclave under superatmospheric pressure for 3 hours at 150° C. while stirring the mass with a stirrer revolving at 477 R. P. M. The reaction mass was filtered to remove solid matter of which 238 parts was obtained. From a nitrogen analysis of the separated solid it was calculated that it contained about 16% of unreacted potassium cyanate.

The low-boiling portion was distilled from the filtrate. One hundred parts was collected that boiled between 42° C. and 81.5° C., which fraction, upon analysis, was found to contain 1.8% of chlorine. From this analysis it was calculated that about 1.6% of allyl chloride was recovered. The remainder of the acetonitrile was removed by distillation at slightly reduced pressure.

When all of the low-boiling material had been removed, about 308 parts of benzene was added to the residue. The benzene solution was washed with 100 parts of water containing about 6 parts of concentrated hydrochloric acid. After washing with water and drying over calcium sulfate, the benzene was distilled off. Distillation of the residue under reduced pressure yielded the following:

| Fraction | Boiling Range, ° C. | Pressure in mm. | Yield in Parts | Product |
|---|---|---|---|---|
| I | 105–120 | 0.05 | 140 | Triallyl isocyanurate. |
| II | 120–140 | 0.05 | 22 | Triallyl isocyanurate mixed with sym.-diallylurea. |
| III | Residue | | 29 | Hard, brittle material when cold. |

The 140 parts of crude triallyl isocyanurate constituting fraction I represents a yield of 56% of the theoretical, and more triallyl isocyanurate was obtained from fraction II.

In another run carried out in essentially the same manner as has just been described, the first cut obtained upon distillation of the benzene-free residue amounted to 151 parts of crude triallyl isocyanurate, which corresponds to 60.5% of the theoretical. A second cut of 22 parts also was obtained, and this, too, comprised a mixture of triallyl isocyanurate and sym.-diallylurea.

It will be understood, of course, by those skilled in the art that our invention is not limited to the particular reactants, proportions thereof, solubilizing agent and proportion thereof, catalyst, nor to the particular conditions of reaction as given in the foregoing examples by way of illustration. Thus, instead of potassium cyanate, any of the other alkali-metal cyanates can be used; and instead of allyl chloride or n-butyl chloride, any other active hydrocarbon halide, more particularly an active alkyl, aralkyl, alkenyl or aralkenyl chloride, bromide or iodide, numerous examples of which have been given hereinbefore, can be used. We prefer to use acetonitrile as the reaction medium, more particularly the agent for improving the solubility of the alkali-metal cyanate in the reaction mass, since the most satisfactory results have been obtained by its use. It will be understood, of course, that other solubilizing agents (reaction media) can be employed, such as those mentioned hereinbefore by way of illustration. Likewise, catalysts other than potassium iodide or triethyl amine can be used. The reaction can be carried out over a fairly wide temperature range, for instance at temperatures within the range of about 65° C. to about 200° C., preferably within the range of about 100° C. to about 175° C., and at atmospheric or superatmospheric pressures. Catalysts which accelerate the reaction are preferably employed when reaction temperatures much below about 125° C. are used.

We claim:

1. The method of preparing an isocyanuric triester which comprises effecting reaction under heat between (1) an alkali-metal cyanate and (2) a hydrocarbon halide represented by the formula RX, where X represents halogen and R represents a radical selected from the class consisting of alkyl, alkenyl, aralkyl and aralkenyl radicals, said reaction being effected while the reactants of (1) and (2) are admixed with an inert, non-hydroxylated solubilizing agent for improving the solubility of the alkali-metal cyanate in the reaction mass, said solubilizing agent being selected from the class consisting of acetonitrile, propionitrile, β-methoxypropionitrile, dimethylcyanamide, acetone, dioxane and nitrobenzene, and isolating the isocyanuric triester thereby produced from the resulting reaction mass.

2. A method as in claim 1 wherein the alkali-metal cyanate is potassium cyanate.

3. The method of preparing a trialkyl isocyanurate which comprises effecting reaction under heat between an alkali-metal cyanate and an alkyl chloride said reaction being effected while the aforementioned reactants are admixed with acetonitrile, and isolating the trialkyl isocyanurate thereby produced from the resulting reaction mass.

4. A method as in claim 3 wherein the alkali-metal cyanate is potassium cyanate.

5. The method of preparing an isocyanuric triester which comprises heating under superatmospheric pressure, at a temperature within the range of about 100° C. to about 175° C., a mixture consisting essentially of (1) an alkali-metal cyanate and (2) a hydrocarbon halide represented by the formula RX, where X represents halogen and R represents a radical selected from the class consisting of alkyl, alkenyl, aralkyl and aralkenyl radicals, said reaction being effected while the reactants of (1) and (2) are admixed with an inert, non-hydroxylated solubilizing agent for improving the solubility of the alkali-metal cyanate in the reaction mass, said solubilizing agent being selected from the class consisting of acetonitrile, propionitrile, β-methoxypropionitrile, dimethylcyanamide, acetone, dioxane and nitrobenzene, and isolating the isocyanuric triester thereby produced from the resulting reaction mass.

6. A method as in claim 1 wherein the inert solubilizing agent is acetonitrile.

7. The method of preparing triallyl isocyanurate which comprises effecting reaction under superatmospheric pressure, at a temperature within the range of about 100° C. to about 175° C., between (1) potassium cyanate and (2) allyl chloride while the reactants of (1) and (2) are admixed with acetonitrile in an amount sufficient to improve the solubility of the potassium cyanate in the reaction mass, and isolating the triallyl isocyanurate thereby produced from the resulting reaction mass.

8. The method of preparing a trialkenyl isocyanurate which comprises effecting reaction under heat between an alkali-metal cyanate and an alkenyl chloride, said reaction being effected while the aforementioned reactants are admixed with acetonitrile, and isolating the trialkenyl isocyanurate thereby produced from the resulting reaction mass.

9. The method of preparing triallyl isocyanurate which comprises effecting reaction under heat between an alkali-metal cyanate and allyl chloride, said reaction being effected while the aforementioned reactants are admixed with acetonitrile in an amount sufficient to improve the solubility of the alkali-metal cyanate in the reaction mass, and isolating the triallyl isocyanurate thereby produced from the resulting reaction mass.

10. A method as in claim 9 wherein the alkali-metal cyanate is potassium cyanate.

11. The method of preparing a triaralkyl isocyanurate which comprises effecting reaction under heat between an alkali-metal cyanate and an aralkyl chloride, said reaction being effected while the aforementioned reactants are admixed with acetonitrile, and isolating the triaralkyl isocyanurate thereby produced from the resulting reaction mass.

12. The method of preparing a triaralkenyl isocyanurate which comprises effecting reaction under heat between an alkali-metal cyanate and an aralkenyl chloride, said reaction being effected while the aforementioned reactants are admixed with acetonitrile, and isolating the triaralkenyl isocyanurate thereby produced from the resulting reaction mass.

DONALD W. KAISER.
DAGFRID HOLM-HANSEN CHURCH.

REFERENCES CITED

The following references are of record in the file of this patent:

Berichte de deut Chem. Ges, 5, pp. 91 and 93 (1872).